US012345238B2

(12) United States Patent
Higgins et al.

(10) Patent No.: US 12,345,238 B2
(45) Date of Patent: Jul. 1, 2025

(54) APPARATUS AND METHOD TO UTILIZE COMPRESSED AIR FOR MOVING MASS BETWEEN TANKS

(71) Applicant: Hawk Spider Energy Corp., Albuquerque, NM (US)

(72) Inventors: Matthew Higgins, Albuquerque, NM (US); Niklas H. Altenberg, Flagstaff, AZ (US)

(*) Notice: Subject to any disclaimer, the term of this patent is extended or adjusted under 35 U.S.C. 154(b) by 190 days.

(21) Appl. No.: 18/364,833

(22) Filed: Aug. 3, 2023

(65) Prior Publication Data

US 2025/0043776 A1 Feb. 6, 2025

(51) Int. Cl.
*F03G 3/00* (2006.01)
*F03B 17/00* (2006.01)
*F03G 7/10* (2006.01)

(52) U.S. Cl.
CPC ............ *F03G 3/087* (2021.08); *F03B 17/005* (2013.01); *F03G 7/104* (2021.08)

(58) Field of Classification Search
CPC ........ F03B 17/005; F03G 3/087; F03G 3/096; F03G 3/097; F03G 7/104
See application file for complete search history.

(56) References Cited

U.S. PATENT DOCUMENTS

| | | | | |
|---|---|---|---|---|
| 2008/0315590 A1* | 12/2008 | Reyes-Florido | ........ | F03G 3/087 74/DIG. 9 |
| 2014/0070543 A1* | 3/2014 | Massimo | ................ | F03G 7/107 290/1 R |
| 2016/0160844 A1* | 6/2016 | Saavedra | ................ | F03G 7/115 185/32 |
| 2018/0171988 A1* | 6/2018 | Fothergill | ................ | H02K 7/14 |

FOREIGN PATENT DOCUMENTS

| | | | | |
|---|---|---|---|---|
| DE | 4128462 A1 | * | 8/1993 | ............ F01B 3/0002 |
| DE | 102004025353 A1 | * | 12/2005 | ............... F03G 6/00 |

* cited by examiner

*Primary Examiner* — Jonathan R Matthias
(74) *Attorney, Agent, or Firm* — Kameron W. Kramer

(57) ABSTRACT

An apparatus and method of using compressed air to move fluid thereby creating a gravity differential of suspended fluid tanks. The apparatus comprises a first tank, a second tank, a glide track, a glide car, an air compressor, a diaphragm pump, an air storage vessel, and a brake system. Fluid is pumped from one tank to the other tank, thus causing the two tanks to rise and lower accordingly. The rotational force and associated rotational spin associated with the raising and lowering of the tanks may be harnessed.

20 Claims, 4 Drawing Sheets

APPARATUS AND METHOD TO UTILIZE COMPRESSED AIR FOR MOVING MASS BETWEEN TANKS

TECHNICAL FIELD

The present invention is directed to energy storage and production, and more particularly to using compressed air to move mass between suspended tanks.

BACKGROUND ART

The need for energy in the world will only increase in the coming years. Historically, non-renewable energies such as oil and coal have been utilized. There has been a push throughout the years to move away from these types of energies for a variety of reasons. Non-renewable energies are, as their name suggests, fossil fuels that cannot be renewed. Additionally, many harmful byproducts are produced and released during the manufacture and use of these non-renewable energies.

Many of the renewable energy sources require seasonal or time of day reactions from either sunlight, wind, or waves. This creates an intermittent power source that can be unreliable in many parts of the world, or requires a large, and permanent infrastructure that is invasive in dense urban environments.

Existing apparatuses contained in the prior art present often need tremendous and permanent infrastructure for both structural and spatial conditions that make their placement and geographic location somewhat limited. Other renewable energy systems are geographically specific (coastal vs. plains) and do not generate equally efficient power production in all areas of the world.

Clean renewable energy without the use of sun, wind, water pressure, ocean waves, fusion, combustion, or other elements is not currently available at a human-scale.

The present invention overcomes the shortcomings contained in the prior art by providing clean renewable energy using opposing fluid (may also be referred to as ballast) tanks and compressed air to create a resultant torque, without the use of natural resources, weather, fusion, or combustion. The present invention can be implemented in any location without access to sun, water, or extreme heights like required with gravity turbine generators. The present invention can be easily transported requiring less permanent infrastructure and installed in places where other energy sources are not appropriate. None of the prior art fully addresses the problems resolved by the present invention.

The present invention provides a self-contained structure and does not require significant infrastructure prior to installation. Due to the independence from climate specific weather patterns or resource availability this invention can produce the same efficiency of power production in nearly any location in the world.

None of the prior art fully addresses the problems resolved by the present invention. The present invention overcomes these limitations contained in the prior art.

Certain embodiments of the invention have other steps or elements in addition to or in place of those mentioned above. The steps or element will become apparent to those skilled in the art from a reading of the following detailed description when taken with reference to the accompanying figures, if any.

DETAILED DESCRIPTION OF THE INVENTION

Figure 1:
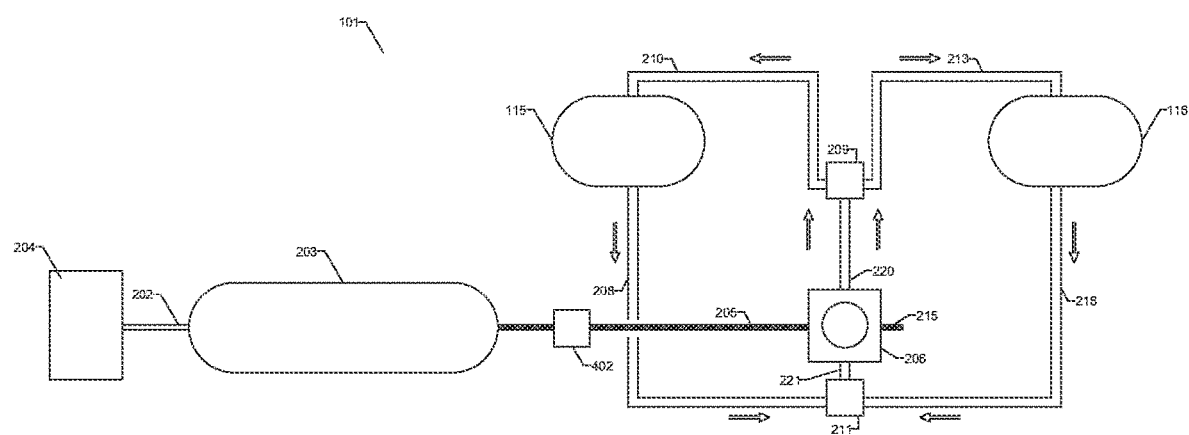
FIG. 1 illustrates a partial top down view of the mass transfer apparatus of the present disclosure.

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system, if any, are semi-diagrammatic and not to scale and, particularly, some of the dimensions are for the clarity of presentation and are shown exaggerated in the drawing figures.

Alternate embodiments have been included throughout, and the order of such are not intended to have any other significance or provide limitations for the present invention.

For expository purposes, the term "horizontal" as used herein is defined as a plane parallel to the plane or surface of the present apparatus, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures, if any. The term "on" means that there is direct contact among elements.

The words "including", "comprising", "incorporating", "consisting of", "have", and "is" are meant to be non-exclusive, meaning additional items, components or elements may be present. Joinder references such as "connected", "connecting", and "coupled" do not limit the position, orientation, or use of systems and/or methods, and do not necessarily infer that two elements are directly connected. All identifying numerical terms are for identification only, and do not refer to the order or preference of any element, embodiment, variation and/or modification.

The present disclosure provides an apparatus and method of using compressed air to move fluid thereby creating a gravity differential of suspended fluid tanks.

The present disclosure provides an apparatus to move mass comprising a first tank; a second tank; a glide track; a glide car; an air compressor; a diaphragm pump; an air storage vessel; and a brake system, wherein the first tank is disposed on one or more first tank support arms with distal ends of the one or more first tank support arms hingeably attached to the glide track, wherein one end of one or more first tank glide car arms are hingeably attached to the one or more first tank support arms at some point between the ends of the one or more first tank support arms and the other end of one or more first tank glide car arms are hingeably attached to the glide car, wherein the second tank is disposed on one or more second tank support arms with distal ends of the one or more second tank support arms hingeably attached to the glide track, wherein one end of one or more second tank glide car arms are hingeably attached to the one or more second tank support arms at some point between the ends of the one or more second tank support arms and the other end of one or more second tank glide car arms are hingeably attached to the glide car, wherein the air compressor provides compressed air to the air storage vessel, and wherein the diaphragm pump is disposed between the air storage vessel and the first tank and the second tank.

The present disclosure further provide a method of moving mass comprising filling a first tank with a fluid that is disposed on one or more first tank support arms with distal ends of the one or more first tank support arms hingeably attached to a glide track, wherein one end of one or more first tank glide car arms are hingeably attached to the one or more first tank support arms at some point between the ends of the one or more first tank support arms and the other end of one or more first tank glide car arms are hingeably attached to a glide car; pumping compressed air into an air storage vessel; and releasing the compressed air from the air storage vessel through a diaphragm pump, wherein the first tank and second tank are connected through the diaphragm pump, wherein the second tank is disposed on one or more second tank support arms with distal ends of the one or more second tank support arms hingeably attached to the glide track, wherein one end of one or more second tank glide car arms are hingeably attached to the one or more second tank support arms at some point between the ends of the one or more second tank support arms and the other end of one or more second tank glide car arms are hingeably attached to the glide car, wherein the diaphragm pump creates suction whereby fluid from the first tank is pumped to the second tank through the diaphragm pump, wherein a brake system suspends the now empty first tank until the fluid transfer is fully completed to the now full second tank, wherein the glide car is disposed on glide car wheels that allow the glide car to travel on the glide track, wherein once the fluid transfer is complete from the first tank to the second tank, the glide car travels along the track and moves the one or more first tank glide car arms and one or more second tank glide car arms, respectively, and in-turn, the now full second tank descends and the now empty first tank ascends, and wherein this process is repeated whereby the fluid from the full tank is transferred to the empty tank causing the full tank to descend and the empty tank to ascend.

The present disclosure further provides an apparatus to move mass comprising a first tank; a second tank; a glide track; a glide car; an air compressor; a diaphragm pump; an air storage vessel; and a brake system, wherein the two tanks are connected to the glide track and the glide car via support arms that are attached hingeably to the glide track and the glide car, wherein the two tanks are connected through the diaphragm pump, and wherein the diaphragm pump is connected to the air storage vessel.

The present disclosure provides methods of "dropping" and "raising" two tanks using compressed air to create closed loop pumped hydroelectric energy storage ("PHES"). The present disclosure harness gravitational potential energy. Multiple embodiments of methods of utilizing compressed air to assist in the dropping and lowering the tanks are disclosed herein, but other methods may be utilized to achieve the desired results.

FIG. 1 illustrates a partial top down view of mass transfer apparatus 101.

Air compressor 204 compresses ambient air and sends to air tank 203 through air path 202. The pressurized air stream 205 is released from air tank 203 and passes through air supply valve 402 and into and through air pump 206. Air pump 206 is preferably a diaphragm pump and may be referred to as a diaphragm pump.

Fluid from the tank that is emptying flows through fluid intake valve 211 into air pump supply path 221 and enters air pump 206. The fluid then flows out of air pump 206 via air pump outlet path 220 and through fluid supply valve 209 which switches directing fluid from the full tank (either the first tank or the second tank) to the empty fluid tank (the other of the first tank or the second tank).

A brake system disposed on glide car 126 suspends empty tank in place until fluid fully transfers into the tank. The brake system comprises a pneumatic brake cylinder but may comprise any other form of braking that is suitable for the desired purpose of the present disclosure, such as, including but not limited to, hydraulic.

The operation of air pump 206 creates suction, pulling fluid from full tank, through air pump 206, and into empty tank. Air exhaust 215 allows compressed air to escape into the environment from air pump 206.

First tank 115 and second tank 116 are disposed on separate sets of hinges, allowing both tanks to move upwardly and downwardly, with the assistance of glide car 126 which disposed on glide car wheels 127 that allow glide car 126 to travel on glide track 125. All of these elements are shown more fully in FIG. 2.

After fluid flows through fluid supply valve 209, the fluid flows through the tank that is being filled up either via first fluid supply path 210 or second fluid supply path 213.

First fluid supply path 210 allows fluid to flow from fluid supply valve 209 to first tank 115. First fluid intake path 208 allows fluid to flow from first tank 115 to air pump 206, passing first through fluid intake valve 211.

Second fluid supply path 213 allows fluid to flow from fluid supply valve 209 to second tank 116. Second fluid intake path 216 allows fluid to flow from second tank 116 to air pump 206, passing first through fluid intake valve 211.

The brake system disposed on glide car 126 system releases the now full tank which causes it to fall with gravity, thus moving glide car 126. Gravity lowers the now full fluid tank and simultaneously raises the now empty tank.

As the now full fluid tank descends, a glide-track gear rotates via motion of a rack gear parallel to glide track 125, as the tank support arms of the descending fluid tank fold downward with the full fluid tank. Upon movement of the glide track gear(s) via the rack and pinion gear, gear box(es) also rotates via force from the tank support arms of the descending fluid tank folding/pushing with glide car 126 to a lever-arm gear connector, thus rotating gear box(es). Upon rotation of the gear box(es), a gear box transfers low revolutions per minute (RPM) torque and converts to higher RPM torque.

Brake system disposed on glide car 126 engages glide car 126, thus stopping first tank 115 and second tank 116 from moving once both tanks come to a stop.

This process repeated, except that compressed air can be stored in the air tank 203 and used for multiple cycles, thus not having to utilize air compressor 204 constantly.

Figure 2:
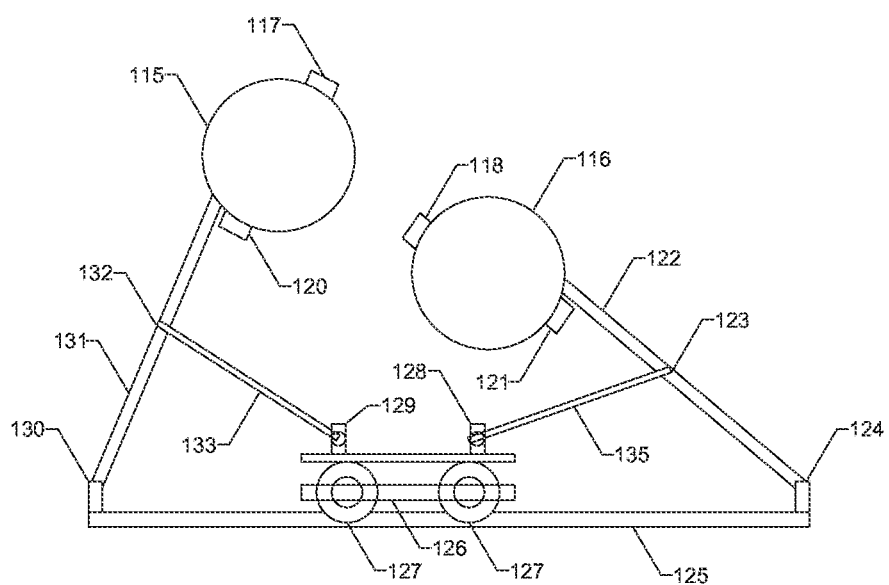
FIG. 2 illustrates a partial side view of the mass transfer apparatus of the present disclosure showing the first tank and second tank and how they are mounted.

FIG. 2 illustrates a partial side view of mass transfer apparatus 101 showing first tank 115 and second tank 116 and how they are mounted.

First tank 115 is disposed on first tank support arms 131. The distal ends of first tank support arms 131 are hingeably attached to glide track 125 via first tank support arm hinges 130. One end of first tank glide car arms 133 are hingeably attached to first tank support arms 131 at some point between the ends of first tank support arms 131. The other end of first tank glide car arms 133 are hingeably attached to glide car 126 via hinges 129.

Second tank 116 is disposed on second tank support arms 122. The distal ends of second tank support arms 122 are hingeably attached to glide track 125 via second tank support arm hinges 124. One end of second tank glide car arms 135 are hingeably attached to second tank support arms 122 at some point between the ends of second tank support arms 122. The other end of second tank glide car arms 135 are hingeably attached to glide car 126 via hinges 128.

Glide car 126 is disposed on glide car wheels 127 that allow glide car 126 to travel on glide track 125.

Figure 3:
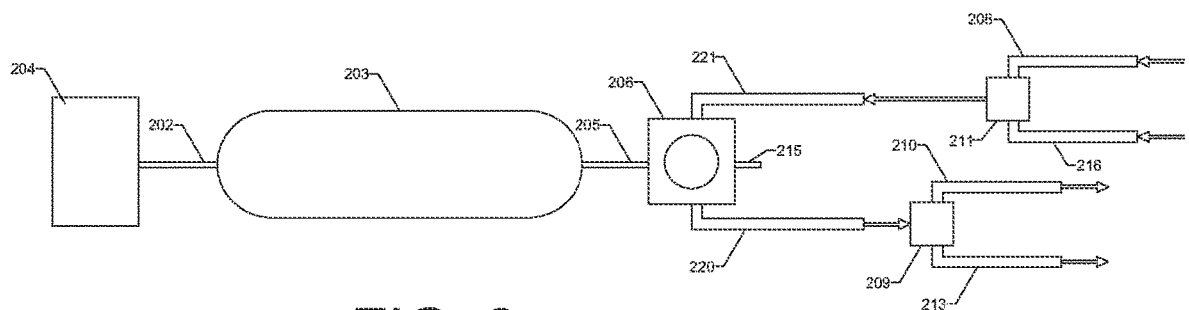
FIG. 3 illustrates a partial top down view of the mass transfer apparatus of the present disclosure showing the components leading up to the first tank and the second tank.

FIG. 3 illustrates a partial top down view of mass transfer apparatus 101 showing the components leading up to first tank 115 and second tank 116.

Figure 4:
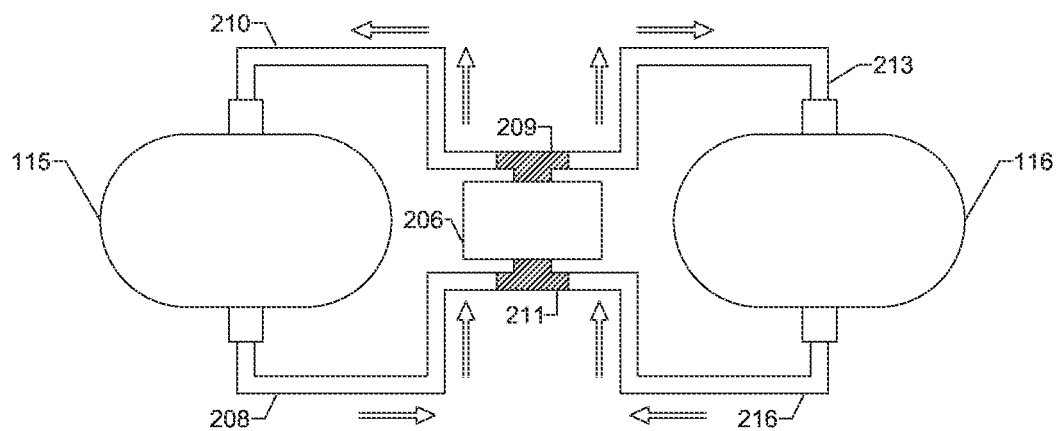
FIG. 4 illustrates a partial top down view of the mass transfer apparatus of the present disclosure showing the first tank and the second tank and the fluid supply paths leading to and from them.

FIG. 4 illustrates a partial top down view of mass transfer apparatus 101 showing first tank 115 and second tank 116 and the fluid supply paths leading to and from them.

First fluid supply path 210 allows fluid to flow from air pump 206 to first tank 115. First fluid intake path 208 allows fluid to flow from first tank 115 to air pump 206, passing first through fluid intake valve 211.

Second fluid supply path 213 allows fluid to flow from air pump 206 to second tank 116. Second fluid intake path 216 allows fluid to flow from second tank 116 to air pump 206, passing first through fluid intake valve 211.

Fluid supply valve 209 switches directing fluid from the full tank (either the first tank or the second tank) to the empty fluid tank (the other of the first tank or the second tank).

All references to "arms" can mean one or more arms, or other suitable device that achieves the desired result.

Any number of glide car wheels 127 may be disposed on glide car 126.

The brake system of glide car 126 may comprise any type of brake system that allows for the desired result.

The brake system may be disposed on any of the arms of the present invention.

First tank 115 begins a cycle such that when first tank 115 is full and opposing second tank 116 is empty, first tank 115 descends. Glide car 126 allows first tank glide car arms 133 to move laterally allowing first tank 115 to descend. As first tank 115 descends, first tank support arms 131 fold downward with first tank 115.

As glide car 126 moves laterally with the descension of first tank 115, second tank glide car arms 135 push second tank support arms 122 and in turn causes second tank 116 to ascend. This is repeated.

Upon full descension of first tank 115, air pump 206 pumps fluid to the empty and now suspended second tank 116, thus reversing the process of raising the first tank 115 once all fluid has been transferred to second tank 116.

The motion from the tanks travelling from the starting position to the resting position creates rotational force and associated rotational spin that may be harnessed for other uses.

The "fluid" in the preferred embodiment is a mixture of propylene glycol and water. However, there are any number of other mixtures that are suitable to act as the "fluid" for the apparatus of the present invention. Specifically, liquids with a high density and low viscosity are preferred for the "fluid". As such, the word "fluid" refers to any fluid that allows the apparatus to act as desired in the present disclosure.

While a system that utilizes a glide car is disclosed herein as the preferred embodiment, any number of methods of lowering and raising two opposing tanks may be used. Two alternate embodiments are disclosed herein, although any number of methods may be utilized.

All references to a "gear box" or "gear boxes" comprise any other method that achieves the desired outcome, such as, including, but limited to, the use of a lever-arm.

In an alternate embodiment, first tank 115 and second tank 116 are both attached to a pulley support line that is displaced on a pulley. When one of the tanks is filled with fluid, it falls, thus raising the now empty tank via the pulley.

In an alternate embodiment, first tank 115 and second tank 116 are connected in a pendulum configuration. First tank 115 and second tank 116 are each disposed on solid poles. The distal ends of the solid poles are each securably attached to a pivot point to form a "V" configuration. The pivot point allows first tank 115 and second tank 116 to swing back and forth in unison. The configuration of first tank 115 and second tank 116 can be in a "V" configuration, or more or less of an angle to achieve the desired result.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying figures are to be interpreted in an illustrative and non-limiting sense.

What is claimed is:

1. An apparatus to move mass, the apparatus comprising:
   a first tank;
   a second tank;
   a glide track;
   a glide car;
   an air compressor;
   a diaphragm pump;
   an air storage vessel; and
   a brake system,
   wherein the first tank is disposed on one or more first tank support arms with distal ends of the one or more first tank support arms hingeably attached to the glide track,
   wherein one end of one or more first tank glide car arms are hingeably attached to the one or more first tank support arms at some point between the ends of the one or more first tank support arms and the other end of one or more first tank glide car arms are hingeably attached to the glide car, wherein the second tank is disposed on one or more second tank support arms with distal ends of the one or more second tank support arms hingeably attached to the glide track, wherein one end of one or more second tank glide car arms are hingeably attached to the one or more second tank support arms at some point between the ends of the one or more second tank support arms and the other end of one or more second tank glide car arms are hingeably attached to the glide car, wherein the air compressor provides compressed air to the air storage vessel, and wherein the diaphragm pump is disposed between the air storage vessel and the first tank and the second tank.

2. The apparatus to move mass of claim 1, wherein the glide car is disposed on glide car wheels that allow the glide car to travel on the glide track.

3. The apparatus to move mass of claim 1, wherein the two tanks are connected via the diaphragm pump.

4. The apparatus to move mass of claim 1, wherein the glide car travels along the glide track whenever the first tank and the second tank are moving upward and/or downward.

5. The apparatus to move mass of claim 1, wherein compressed air that passes through the diaphragm pump is released into the atmosphere.

6. The apparatus to move mass of claim 1, wherein a series of fluid intake paths and fluid supply paths direct the flow of fluid from the tanks to the air pump and from the air pump to the fluid tanks, respectively.

7. The apparatus to move mass of claim 1, wherein the fluid intake paths from the tanks flow through a fluid intake valve prior to entering the air pump.

8. The apparatus to move mass of claim 1, wherein fluid exiting the diaphragm pump enters a fluid supply valve which switches directing fluid from the first tank to the second fluid tank and vice versa.

9. A method of moving mass, the method comprising:
filling a first tank with a fluid that is disposed on one or more first tank support arms with distal ends of the one or more first tank support arms hingeably attached to a glide track,
wherein one end of one or more first tank glide car arms are hingeably attached to the one or more first tank support arms at some point between the ends of the one or more first tank support arms and the other end of one or more first tank glide car arms are hingeably attached to a glide car;
pumping compressed air into an air storage vessel; and
releasing the compressed air from the air storage vessel through a diaphragm pump,
wherein the first tank and a second tank are connected through the diaphragm pump, wherein the second tank is disposed on one or more second tank support arms with distal ends of the one or more second tank support arms hingeably attached to the glide track,
wherein one end of one or more second tank glide car arms are hingeably attached to the one or more second tank support arms at some point between the ends of the one or more second tank support arms and the other end of one or more second tank glide car arms are hingeably attached to the glide car,
wherein the diaphragm pump creates suction whereby fluid from the first tank is pumped to the second tank through the diaphragm pump,
wherein a brake system suspends the first tank until the fluid transfer is fully completed to the second tank,
wherein the glide car is disposed on glide car wheels that allow the glide car to travel on the glide track,
wherein once the fluid transfer is complete from the first tank to the second tank, the glide car travels along the track and moves the one or more first tank glide car arms and one or more second tank glide car arms, respectively, and in-turn, the second tank descends and the first tank ascends, and
wherein this process is repeated whereby the fluid from the second tank is transferred to the first tank causing the first tank to descend and the second tank to ascend.

10. The method of moving mass of claim 9, wherein a series of fluid intake paths and fluid supply paths direct the flow of fluid from the tanks to the diaphragm pump and from the diaphragm pump to the fluid tanks, respectively.

11. The method of moving mass of claim 9, wherein the fluid intake paths from the tanks flow through a fluid intake valve prior to entering the diaphragm pump.

12. The method of moving mass of claim 9, wherein fluid exiting the diaphragm pump enters a fluid supply valve which switches directing fluid from the first tank to the second fluid tank and vice versa.

13. The method of moving mass of claim 9, wherein the first tank begins a cycle when the first tank is full and the second tank is empty, and a brake cylinder begins to retract from a full extended position and the first tank descends.

14. The method of moving mass of claim 9, wherein when the first tank descends, a glide track gear rotates via rack gear parallel to the glide track, as the first tank support arms of the first tank fold downward with the first tank.

15. The method of moving mass of claim 9, wherein the fluid is a mixture of propylene glycol and water.

16. An apparatus to move mass, the apparatus comprising:
a first tank;
a second tank;
a glide track;
a glide car;
an air compressor;
a diaphragm pump;
an air storage vessel; and
a brake system,
wherein the two tanks are connected to the glide track and the glide car via support arms that are attached hingeably to the glide track and the glide car,
wherein the two tanks are connected through the diaphragm pump, and
wherein the diaphragm pump is connected to the air storage vessel.

17. The apparatus to move mass of claim 16, wherein the first tank is disposed on one or more first tank support arms with distal ends of the one or more first tank support arms hingeably attached to the glide track.

18. The apparatus to move mass of claim 17, wherein one end of one or more first tank glide car arms are hingeably attached to the one or more first tank support arms at some point between the ends of the one or more first tank support arms and the other end of one or more first tank glide car arms are hingeably attached to the glide car.

19. The apparatus to move mass of claim 18, wherein the second tank is disposed on one or more second tank support arms with distal ends of the one or more second tank support arms hingeably attached to the glide track.

20. The apparatus to move mass of claim 19, wherein one end of one or more second tank glide car arms are hingeably attached to the one or more second tank support arms at some point between the ends of the one or more second tank support arms and the other end of one or more second tank glide car arms are hingeably attached to the glide car.

* * * * *